United States Patent

Vansteenkiste et al.

[11] Patent Number: 5,155,931
[45] Date of Patent: Oct. 20, 1992

[54] METHOD OF GROWING PLANTS AND GROWTH SUBSTRATE FOR USE IN THE METHOD

[75] Inventors: Paul Vansteenkiste, Gits; Herman Van Bastelaere, Beveren, both of Belgium

[73] Assignee: Shell Internationale Research Maatschappij B.V., Netherlands

[21] Appl. No.: 845,835

[22] Filed: Mar. 6, 1992

Related U.S. Application Data

[63] Continuation of Ser. No. 422,817, Oct. 19, 1989, abandoned.

[30] Foreign Application Priority Data

Oct. 20, 1988 [GB] United Kingdom ............... 8824544

[51] Int. Cl.$^5$ .................... A01G 31/00; A01G 9/10
[52] U.S. Cl. .................... 47/64; 47/DIG. 3; 47/41.12
[58] Field of Search ............. 47/59, 64, 41.12, DIG. 3

[56] References Cited

U.S. PATENT DOCUMENTS

| | | | |
|---|---|---|---|
| 3,546,145 | 12/1970 | Granger et al. | |
| 3,608,238 | 9/1971 | Reuter | 47/64 |
| 3,871,130 | 3/1975 | Lavo | 47/9 |
| 3,922,977 | 12/1975 | Lavo | 47/9 |
| 3,978,855 | 9/1976 | McRae | 428/310.5 |
| 4,114,316 | 9/1978 | Cohen | 47/64 |
| 4,143,219 | 3/1979 | Hensch | 521/107 |
| 4,146,687 | 3/1979 | Reale | 521/107 |
| 4,175,355 | 11/1979 | Dedolph | 47/64 |
| 4,178,420 | 12/1979 | Reale | 521/107 |
| 4,241,537 | 12/1980 | Wood | |
| 4,487,854 | 12/1984 | Hartman | |
| 4,740,528 | 4/1988 | Garvey | 521/128 |
| 4,789,584 | 12/1988 | Perrin | 47/64 |

FOREIGN PATENT DOCUMENTS

| | | | |
|---|---|---|---|
| 231214 | 6/1987 | Fed. Rep. of Germany | |
| 61-234718 | 2/1986 | Japan | |
| 62-13427 | 1/1987 | Japan | |
| 1466712 | 5/1973 | United Kingdom | |
| 1543961 | 4/1979 | United Kingdom | 47/64 |
| 2080083 | 2/1982 | United Kingdom | 47/64 |

*Primary Examiner*—Henry E. Raduazo

[57] ABSTRACT

A method of growing a plant, which comprises growing the plant mat consisting of an open-cell polyurethane foam comprising from 10 to 50% by weight of ethyleneoxy residues and having a density in the range of from 15 to 30 kilograms per cubic meter and a mean number of cells per centimeter in the range of from 10 to 25, a polyurethane foam for use in the method, and a process for preparing the polyurethane foam.

5 Claims, No Drawings

METHOD OF GROWING PLANTS AND GROWTH SUBSTRATE FOR USE IN THE METHOD

This application is a continuation of application Ser. No. No. 07/422,817, filed Oct. 19, 1989 now abandoned.

The present invention relates to a method of growing plants, to a growth substrate for use in the method, and to a process for the preparation of the growth substrate.

The advantages of growing plants on synthetic growth substrates instead of soil are well known. Thus, synthetic growth substrates are easier to handle than soil, pest-free and enable plants to be supplied with controlled amounts of nutrients. However, few synthetic materials are available which are known to be capable of reproducing the special physical properties of soil that are essential for the support of plant growth.

One synthetic material which is known to be an excellent substitute for soil is rockwool, a form of inorganic fibre. Rockwool is, at present, widely used in glasshouses as a substrate for plant growth. However, rockwool suffers from a number of disadvantages. One disadvantage is that it is difficult to dispose of. Thus it cannot be burnt because it is composed of a mineral. Furthermore, because after use it commonly contains potentially toxic agrochemicals, it poses a threat when left in places where the toxic chemicals can leach out into groundwater and thence into drinking water. Another disadvantage of rockwool is that it has a short lifetime because it is easily damaged during removal of plants and sterilisation.

Other synthetic materials which have been investigated as potential plant growth substrates include forms of polyurethane foam. Polyurethane foam can exist in a wide variety of forms, the properties of which depend upon their chemical composition and their physical structure.

There remains a need for substrates which are capable of reproducing the special physical properties of soil that are essential for the support of plant growth, which can readily be disposed of and which have an acceptable lifetime.

It has now been found that plants can advantageously be grown on a mat consisting of a particular polyurethane foam.

Accordingly, the present invention provides a method of growing a plant, which comprises growing the plant on a mat consisting of an open-cell polyurethane foam comprising from 10 to 50% by weight of ethyleneoxy ($-CH_2CH_2O-$) residues and having a density in the range of from 15 to 30 kilogrammes per cubic metre and a mean number of cells per linear centimetre in the range of from 10 to 25.

In the method according to the invention, the plant may be grown on the mat from a seed, from plant tissue, from a cutting, from a seedling or from a maturing plant. As the plant grows, its roots will penetrate into the mat and thereby anchor the plant. When the plant is grown from a seedling or a maturing plant, the seedling or maturing plant is preferably applied to the mat with its roots still embedded in the growth substrate on which it was raised. In this way, the plant remains supported by the growth substrate until its roots have grown into the mat. The growth substrate may be the same or different material to the mat, for example it may be rockwool.

Any plant can be grown, for at least a part of its life, by the method according to the invention. Preferably the plant is an ornamental plant or a vegetable crop plant. Examples of ornamental plants include Gerbera, Rosae, Chrysanthenum and Dianthus. Examples of vegetable crop plants include Cucurbitaceae, Capsicum, Solanum and lactuca sativa (lettuce). Particularly good crop yields have been obtained from annual, fruit-bearing plants, for example Solanum (tomatoes), Capsicum (paprikas) and Cucurbitaceae (cucumbers), growing by the method according to the invention.

The method according to the invention is preferably performed in a glasshouse.

The conditions required for plants to grow on the mats according to the method of the invention are well known to those skilled in the art of hydroponic and substrate culture. Typically the mats are arranged along an irrigation system and an aqueous solution of essential plant nutrients is fed to them. Advantageously, the mats are contained in polyethylene bags having one or more holes on their upper surface, through which plants grow, and one or more holes on the lower surface, for drainage.

Preferably the polyurethane foam comprises from 12 to 40% by weight of ethyleneoxy residues. More preferably it comprises from 13 to 20% by weight of ethyleneoxy residues.

The density of the foam is preferably in the range of from 18 to 25 kg m$^{-3}$.

The mean number of cells per linear cm is preferably in the range of from 14 to 20.

According to another aspect, the invention provides an open-cell polyurethane foam, which comprises from 10 to 50% by weight of ethyleneoxy residues and has a density in the range of from 15 to 30 kg m$^{-3}$ and a mean number of cells per cm in the range of from 10 to 25.

The polyurethane foam according to the invention is a homogeneous, semi-rigid, open-cell polyurethane foam.

Polyurethane foam according to the invention has been found to be particularly well suited for use as a growth substrate for plants in hydroponic culture. Thus the foam is not phytotoxic; it is sufficiently soft and porous for roots to be able to grow into it, yet it is sufficiently hard to support the growing stem and leaves above; and it can hold the right balance of aqueous nutrient solution and air necessary to support plant growth.

A further advantage of polyurethane foam according to the invention is that it can readily be reused or disposed of. Thus it has been found that polyurethane foam according to the invention may be steam sterilised. Furthermore, plants may readily be removed with minimal damage to the foam. The polyurethane foam may also readily be disposed of by burning, and thus does not have to be buried after use. In particular its relatively low nitrogen content leads to a minimum nitrous oxide content in the combustion gas compared to known polyurethane foams.

It is well known that polyurethane foam is often compressed for transportation. When the foam is compressed, the density will obviously be increased. For the avoidance of doubt, therefore, the density and the mean number of cells per centimetre refer in this specification to the density and mean number of cells per centimetre when the foam is fully expanded (i.e. without compression at atmosphere pressure).

It has been found to be very convenient to vacuum seal polyurethane foam mats according to the invention in polyethylene bags. The bags are of such a size, relative to the mats, that when the bag is punctured, the foam will become fully expanded in the bag and may then be used directly in the bag as a growth substrate for plants.

According to another aspect, the invention provides a process of preparing an open-cell polyurethane foam comprising from 10 to 50% by weight of ethyleneoxy residues and having a density in the range of from 15 to 30 kg m$^{-3}$ and a mean number of cells per cm in the range of from 10 to 25, which comprises reacting a mixture containing 100 parts by weight of one or more polyols, the one or more polyols comprising from 15 to 65% by weight of ethyleneoxy residues and having a hydroxyl number in the range of from 25 to 150, a molecular weight in the range of from 1500 to 6000 and a functionality in the range of from 2.5 to 4;

from 3 to 7 parts by weight of water;

from 1 to 2.5, preferably from 1.5 to 2.5, parts by weight of one or more silicone surfactants;

optionally, up to 5 parts by weight of one or more expanding agents;

from 0.1 to 1 parts by weight of catalyst; and one or more organic isocyanates, the amount of the one or more isocyanates being from 90 to 120% of the amount necessary to react all of the active hydrogen atoms of the one or more polyols and water.

As is well known to those skilled in the art, polyols may be prepared by reacting an alcohol, for example ethylene glycol or glycerol, with an epoxide such as ethylene oxide or propylene oxide. Polyols thus prepared contain ethyleneoxy residues (derived from ethylene oxide) and/or 2-methylethyleneoxy residues (derived from propylene oxide). Polyols are conventionally characterised by their molecular weight, their functionality, their hydroxyl number and their content of ethyleneoxy and 2-methylethyleneoxy residues.

In the process according to the invention, preferably the one or more polyols comprises from 35 to 85% by weight of 2-methylethyleneoxy residues.

Preferably the one or more polyols consists of a mixture of two immiscible polyols, one polyol comprising from 5 to 15% by weight of ethyleneoxy residues and from 85 to 95% by weight of 2-methylethyleneoxy residues and the other comprising from 70 to 80% by weight of ethyleneoxy residues and from 20 to 30% by weight of 2-methylethyleneoxy residues.

Suitable silicone surfactants include B 2270 (Trade Mark; Goldschmidt) and SC 154 (Trade Mark; Union Carbide). The Applicants have found that certain silicone surfactants facilitate the uptake of water and impart to the polyurethane foam a significantly improved water absorbance capacity, which leads to an increase in crop weight. Such preferred silicone surfactants include SC 154 (Trade Mark; Union Carbide).

Suitable organic isocyanates for use in the process according to the invention are those conventionally used in the preparation of polyurethane foams. For example they may be aliphatic or aromatic diisocyanates. Examples of conventionally used isocyanates include toluol diisocyanates and methylene-diphenyl diisocyanate. Preferably the one or more organic isocyanates is a mixture of 2,4- and 2,6-toluol diisocyanates.

The reaction mixture preferably comprises from 4 to 6 parts by weight of water.

Preferably the amount of the one or more isocyanates is in the range of from 100 to 110% of the amount necessary to react all of the reactive hydrogen atoms of the one or more polyols and water.

When used, any conventional polyurethane foam expanding agent may be employed in the process according to the invention. For example the expanding agent may be a fluorinated hydrocarbon such as a chlorofluoromethane, e.g., fluorotrichloromethane, or a fluorochloroethane, or a chlorinated hydrocarbon such as dichloromethane.

The catalyst employed in the process according to the invention may be any conventional catalyst employed in the preparation of polyurethane foams. For example it may be an amine catalyst for the blowing reaction. Thus it may comprise, for example, a mixture of triethylenediamine for the blowing reaction and stannous octoate for the polymerisation reaction.

The reaction to form the polyurethane foam may be effected using apparatus and techniques well known to those skilled in the art.

The invention will now be illustrated by the following Examples.

EXAMPLE 1

Preparation of a polyurethane foam according to the invention.

The foam was formed by supplying to a one shot low pressure mixing head (modified by the addition of fine needles for injecting air) at ambient temperature 0.251 parts by weight of stannous octoate;

1.602 parts by weight of B 2270 (Trade Mark) GOLDSCHMIDT silicone surfactant;

0.05 parts by weight of bis-2-dimethylaminoethylether and 0.22 parts by weight of a 33% by weight solution of triethylenediamine in dipropyleneglycol;

80 parts by weight of Shell Caradol E204 (Trade Mark) (a commercially available polyol derived from glycerol, ethylene oxide and propylene oxide having a molecular weight of 3000, a hydroxyl number of 58, a functionality of 2.96, an ethyleneoxy content of 9.5% and a 2-methylethyleneoxy content of 90.5%);

5 parts by weight of water;

61.17 parts by weight of an organic isocyanate consisting of a mixture of 80% by weight 2,4-toluylene diisocyanate and 20% by weight of 2,6-toluylene diisocyanate (corresponding to 107% of the amount necessary to react all of the active hydrogen atoms of the one or more polyols and water) in that order, then, after 3 seconds, 20 parts by weight of VORANOL CP X D1421 (Trade Mark, a commercially available polyol derived from glycerol, ethylene oxide and propylene oxide having a molecular weight of 5000, a hydroxyl number of 33, a functionality of 2.7, an ethyleneoxy content of 75% and a 2-methylethyleneoxy content of 25%) and 3.503 parts by weight of fluorotrichloromethane, with air being injected through fine needles into the separate polyol stream. The resultant open-cell polyurethane foam had the following phsical characteristics:

Percentage by weight ethyleneoxy residues—14.5

Density—19 kg m$^{-3}$

Number of cells per cm (average of 5 measurements)—16

Note—the two polyols employed are immiscible. In combination they amount to 100 parts by weight of polyol and have a molecular weight of 3400, a hydroxyl number of 53, a functionality of 2.91, an ethyleneoxy content of 22.6% and a 2-methylethyleneoxy content of 77.4%.

EXAMPLE 2

Growth of plants on a foam according to the invention

Polyurethane foam prepared according to the process of Example 1 was cut into mats measuring 100 cm×40 cm×20 cm at full water saturation. Each of these mats was then sealed under a vacuum in a polyethylene cover.

Before use, the polyethylene bags were pierced so that the polyurethane foam inside could fully expand. Circular holes measuring 10 cm in diameter were then cut in the top surface of the bags. The mats, still contained in the bags, were then arranged along a drip irrigation system in a glasshouse at a temperature of 18° to 20° C. An aqueous solution of plant nutrient was then supplied to the mats through each of the circular holes.

After the mats had been allowed to soak up sufficient aqueous nutrient, tomato or cucumber plant seedlings, their roots embedded in small blocks of rockwool on which they had been raised, were put on the mats over the circular holes. The seedlings were then allowed to grow. After the roots had grown into the mat a small drainage hole was cut at the lower side of the bags.

In comparative experiments, the procedure was repeated but using slabs of rockwool measuring 100×15×7.5 cm in polyethylene covers instead of the polyurethane foam mats. The results are tabulated below.

TABLE

| Growth substrate | Crop yield in kg m$^{-2}$ glasshouse area (Average of 7 repeats) over whole harvest season |
|---|---|
| Polyurethane (Tomato) | 25.8 |
| Grodan Rockwool (Tomato) | 27.4 |
| Polyurethane (Cucumber) | 44.4 |
| Rockwool (Cucumber) | 47.8 |

It is clear from these results that the polyurethane foam according to the invention is an excellent growth substrate for cucumbers and tomatoes.

EXAMPLE 3

Growth of plants on a foam according to the invention

In a second experiment, over a shorter period, a similar comparison was set up between rockwool slabs in polythene covers (measuring 100×20×7.5 cm) and polyurethane foam prepared following the method of the invention. Of the latter 3 alternatives were tested:
a. 100×22×5 cm, drained at the bottom
b. 100×22×5 cm, drained at 2 cm above the bottom
c. 100×15×7 cm, drained at 2 cm above the bottom In this test cucumber plants were grown on the mats. The comparative crop yields were established over seven identical repeats over a period of seven weeks after planting and 3 weeks of havesting:
Grodan rockwool: 2.51 kg/sq.meter glasshouse area.
a.: 3.03 kg/sq.meter glasshouse area.
b.: 3.23 kg/sq.meter glasshouse area.
c.: 3.41 kg/sq.meter glasshouse area.

The example shows, that for the high value early crops, the crop yields are better than for Grodan rockwool.

EXAMPLE 4

Water absorbency of foams according to the invention

Three polyurethane foams were prepared according to the process of Example 1. Each was cut into a sample block of size 110 mm×110 mm×50 mm, placed onto a balance and dosed with distilled water at a rate of 5 ml/min using a pipette. The increase in weight in grammes over the dry sample block was recorded.

| Sample No. | Percentage Ethyleneoxy residues | Parts by weight of silicone oil added | |
|---|---|---|---|
| | | oil A | oil B |
| I | 19.0 | 1.2 | — |
| II | 20.0 | — | 1.7 |
| III | 9.0 | — | 1.0 | oil A is silicone oil B 2270 (Trade Mark) from Goldschmidt; viscosity (25° C.) 740±180 MPa s; density 1030 g/cc oil B is silicone oil SC 154 (Trade Mark) from Union Carbide; viscosity (25° C.) 1150 cSt; specific gravity 1.03

| Amount of water added (ml) | Sample No. | | |
|---|---|---|---|
| | I | II | III |
| 50 | 10.7 | 44.9 | 5.2 |
| 100 | 15.2 | 77.3 | 4.0 |
| 150 | 19.4 | 107.0 | 3.95 |
| 200 | 19.9 | 119.0 | |
| 250 | 20.2 | 128.0 | |

From the above Table it can readily be seen that Sample II has a significantly higher water absorbency than Sample I and Sample III and that Sample III, which has a lower percentage of ethyleneoxy residues than is required by the present invention, has a markedly reduced ability to absorb water.

In plant growth tests on tomato crops it has been found that Sample II led to a 3.58% weight increase in tomatoes compared with tomatoes grown under comparable conditions on a Grodan Rockwool substrate.

We claim:
1. A method of growing a plant, which comprises providing a polyurethane foam mat consisting of an open-cell polyurethane foam comprising from 10 to 50% by weight of ethyleneoxy residue and having a density in the range of from 15 to 30 kg/m$^3$ and a mean number of cells per linear centimeter in the range of from 10 to 25,
said polyurethane foam prepared by the method comprising reacting a mixture containing (a) 100 parts by weight of one or more polyols, the one or more polyols comprising from 15 to 65% by weight of ethyleneoxy residues and having a hydroxyl number in the range of from 25 to 150, a molecular weight in the range of from 1500 to 6000 and a functionality in the range of from 2.5 to 4.0, (b) from 3 to 7 parts by weight of water, (c) at least 1 part by weight of one or more silicone surfactants, (d) up to 5 parts by weight of one or more expanding agents, (e) from 0.1 to 1 parts by weight of catalyst; and (f) one or more organic isocyanates, the amount of the one or more isocyanates being from 90 to 120% of the amount necessary to react all of the active hydrogen atoms of the one or more polyols and water, placing a plant seed, plant cutting, or the roots of a plant seedling or mature plant in said foam mat, and feeding nutrients to said plant while growing by contacting said foam with an aqueous solution of nutrients, said mat serving as a dimensional support for said plant and its root system during said growing.

2. A method as claimed in claim 1, in which the polyurethane foam comprises from 13 to 20% by weight of ethyleneoxy residues.

3. A method as claimed in claim 1, in which the polyurethane foam has a density in the range of from 18 to 25 kg/m$^3$.

4. A method as claimed in claim 1, in which the mean number of cells per linear cm is in the range of from 14 to 20.

5. A method as claimed in claim 1, in which the polyurethane foam incorporates from 1.0 to 2.5 parts by weight of a silicone surfactant.

* * * * *